US005854327A

United States Patent [19]

Davis et al.

[11] Patent Number: 5,854,327

[45] Date of Patent: Dec. 29, 1998

[54] MINERAL-FILLED ROOFING MEMBRANE COMPOSITIONS AND USES THEREFOR

[75] Inventors: James A. Davis, Indianapolis; Brian S. Alexander, Sheridan, both of Ind.

[73] Assignee: Bridgestone/Firestone, Inc., Akron, Ohio

[21] Appl. No.: 883,647

[22] Filed: Jun. 27, 1997

[51] Int. Cl.$^{6}$ .......... C08K 3/00

[52] U.S. Cl. .......... 524/445; 524/492; 524/493

[58] Field of Search .......... 524/445, 492, 524/493

[56] References Cited

U.S. PATENT DOCUMENTS

| | | | |
|---|---|---|---|
| 3,280,082 | 10/1966 | Natta et al. | 260/80.7 |
| 3,345,325 | 10/1967 | Martin | 260/41.5 |
| 4,803,020 | 2/1989 | Valaitis | 264/22 |
| 5,370,755 | 12/1994 | Davis et al. | 156/71 |
| 5,407,989 | 4/1995 | Davis et al. | 524/405 |
| 5,582,890 | 12/1996 | Davis et al. | 428/57 |

*Primary Examiner*—Edward J. Cain
*Attorney, Agent, or Firm*—Daniel N. Hall

[57] ABSTRACT

A non-black roof sheeting material may be prepared from a composition of matter comprising 100 parts by weight of at least one polymeric rubber selected from the group consisting of ethylene-propylene-diene terpolymers, ethylene-propylene copolymers and other polyolefinic type polymers; from about 20 to about 300 parts by weight of a blend of at least two mineral fillers, per 100 parts of said polymeric rubber, wherein one of said mineral fillers is a reinforcing silica and wherein another of said mineral fillers is a chemically modified clay; from about 20 to about 150 parts by weight of a processing oil, per 100 parts of said polymeric rubber; from 1 to about 6 parts by weight of a sulfur cure package having at least one accelerator but being devoid of any thiuram accelerators, said cure package allowing said sheeting material to cure at about the same rate as a comparable black roof sheeting material at 160° C. The non-black (white) sheeting material may form the ply of a white-on-black bilaminant roofing membrane or it may represent both the top and bottom ply of a non-black (white) polymeric roof sheeting material.

19 Claims, No Drawings

MINERAL-FILLED ROOFING MEMBRANE COMPOSITIONS AND USES THEREFOR

TECHNICAL FIELD

This invention relates generally to sheeting material used in the construction industry to cover roofs and the like. More particularly, the present invention relates to a mineral-filled, white (i.e., non-black) sheeting material having a cure rate which is substantially equivalent to the cure rate of a conventional carbon black-reinforced sheeting material. The mineral-filled sheeting material provides an exposed surface which is non-staining when exposed to sunlight for extended periods of time and exhibits improved sunlight reflectance, cooly surface temperatures, and improved burn resistivity compared to a carbon black-reinforced sheeting material. The mineral-filled sheeting material can serve as the top ply of a membrane bilaminant or as a single ply roof sheeting material. A method is also provided for covering roofs which includes the step of employing this mineral-filled sheeting material as one ply, preferably the top ply, of a white-on-black membrane bilaminant.

BACKGROUND OF THE INVENTION

Polymeric sheeting material has been used for several years in the roofing and construction industry for covering industrial and commercial flat roofs of new buildings and for refurbishing the roofs of older buildings. Typically, such sheeting material is generally applied to a roof surface in the form of a single ply of roof sheeting material which is in a vulcanized or cured state.

Various rubber compositions have been used over the years, including neoprene, butyl rubber (IIR), ethylene-propylene-diene terpolymers (EPDM), ethylene-propylene rubber (EPM), various ethylene-alkene copolymers, and similar olefinic-type polymers and blends thereof. Because of its outstanding weathering resistance and flexibility, cured EPDM-based roof sheeting has gained particular acceptance in the building and construction industries as a suitable material for roofing purposes. The use of EPDM is also advantageous in that it can be easily mixed with other ingredients such as fillers, processing oils and the like to provide a suitable rubber composition. The rubber composition is normally prepared by vulcanizing it in the presence of sulfur or sulfur containing compounds, such as mercaptans. An earlier U.S. Pat. No. 4,803,020, also teaches the use of radiation crosslinking promoters in an EPDM sheeting composition which can be cured by ionizing radiation.

Such EPDM and other polyolefinic roof sheeting materials have traditionally been reinforced with carbon black and are black in color. The black color is generally provided because of the use of carbon black, coal filler and related petroleum-derived materials or other similarly dark-colored fillers in the composition from which the sheeting material is prepared. While carbon black has been found to be particularly useful as a reinforcing filler in these membrane compositions, there are certain instances where a black membrane may be undesirable. Accordingly, various attempts have been made to provide non-black and, more specifically, mineral-filled, white roof sheeting compositions.

White rubber membrane compositions have typically been produced from a variety of the polymeric rubbers listed hereinabove and non-black mineral fillers such as soft and hard clays, chemically modified clays, calcium carbonate, silicas, talc, mica or titanium dioxide, and non-staining process oils. While these white rubber membranes can be used by themselves on a roof, it is often desirable to laminate these white rubber membranes to standard black rubber membranes which are well known in the art. Typically, this is done by separately extruding and preferably calendering the white rubber membrane compounds and the black rubber membrane compounds and then laminating them together by either a calendering or coextrusion process while the membranes are still in the uncured state. Thus, the black and white rubber plies which comprise the bilaminant can be knitted together during the curing process, the mineral filled, white-colored roof sheeting material preferably serving as the top ply and the carbon black-reinforced sheeting material serving as the bottom ply of the membrane bilaminant.

Accordingly, it is believed desirable to develop a white or off-white, mineral-filled roofing membrane composition which cures at about the same rate as its black roofing membrane counterpart. Typically, this means curing the white roofing composition at a temperature of from about 120° C. to about 170° C., and, as for many EPDM and polyolefinic compositions like those described hereinbelow, at a preferred temperature of about 160° C.

In addition, it is believed desirable to provide superior properties to these white mineral-filled rubber membrane compositions. For example, the sheeting material should desirably include an exposed surface which is non-staining when exposed to sunlight for extended periods of time. It should also exhibit improved sunlight reflectance and impart improved burn resistivity compared to a conventional carbon black-reinforced sheeting material while maintaining similar stress-strain properties, tear characteristics, and cured compound hardness.

The resulting compounds of this invention are seen as being useful to the manufacture of roof sheeting materials where aesthetics, light reflectance and improved burn resistivity are desirable characteristics of a roofing membrane. During the summer months, buildings featuring a mineral-filled, white roofing membrane or a white-on-black membrane bilaminant have been reported to be cooler than the same size building covered with a black rubber roofing membrane composition. In order to gain advantages of the mineral-filled rubber membrane bilaminant, the white ply must be installed with the white surface up or distal to the roof in comparison with the black ply.

Presently, Carlisle Corporation of Carlisle, Pa. produces both a 45 mil and a 60 mil white-on-black unreinforced and reinforced EPDM membrane bilaminant under the tradename Brite Ply. Firestone Building Products Company, a subsidiary of the assignee of record, also produces a white-on-black membrane bilaminant which is installed on the roofs of recreational vehicles and mobile homes.

SUMMARY OF INVENTION

It is therefore, an object of the present invention to provide a mineral-filled, white-colored polymeric sheeting material suitable for use in the construction industry on building roofs and the like.

It is another object of the present invention to provide a mineral-filled, white-colored polymeric sheeting material which has a cure rate which is substantially equivalent to the cure rate at about 160° C. for a carbon black-reinforced polymeric sheeting material.

It is still another object of the present invention to provide a mineral-filled, white-colored polymeric sheeting material, as above, which employs EPDM, EPM or other olefin type polymers as the rubbery component in the sheeting material.

It is yet another object of the present invention to provide a white-colored polymeric sheeting material, as above, that employs a blend of non-black mineral fillers which improves certain physical properties in the sheeting material such as die C and trouser tear resistance and tensile strength.

It is still another object of the present invention to provide a mineral-filled, white-colored polymeric sheeting material, as above, which imparts improved burn resistivity as compared to a single ply, carbon black-reinforced sheeting material.

It is yet another object of the present invention to provide a mineral-filled, white-colored polymeric sheeting material, as above, which has highly improved sunlight reflectance and improved resistance to staining and discoloration.

It is still another object of the present invention to provide a sulfur curable, mineral-filled sheeting material.

It is a further object of the present invention to provide a mineral-filled, white-colored polymeric sheeting material, as above, which may serve as the top ply of a white-on-black membrane bilaminant.

It is still a further object of the present invention to provide a method for covering roofs which employs the mineral-filled, non-black polymeric sheeting material as the top ply of a white-on-black membrane bilaminant.

At least one or more of the foregoing objects, together with the advantages thereof over the known art relating to roof sheeting materials, which shall become apparent from the specification which follows, are accomplished by the invention as hereinafter described and claimed.

In general the present invention provides a non-black roof sheeting material prepared from a composition of matter comprising: 100 parts by weight of at least one polymeric rubber selected from the group consisting of ethylene-propylene-diene terpolymers, ethylene-propylene copolymers and other polyolefinic type polymers; from about 20 to about 300 parts by weight of a blend of at least two mineral fillers, per 100 parts of the polymeric rubber, wherein one of the mineral fillers is a reinforcing silica and wherein another of the mineral fillers is a chemically modified clay; from about 20 to about 150 parts by weight of a processing oil, per 100 parts of the polymeric rubber; from 1 to about 6 parts by weight of a sulfur cure package having at least one accelerator but being devoid of any thiuram accelerators, the cure package allowing the sheeting material to cure at about the same rate as a comparable black roof sheeting material at 160° C.

The present invention also includes a bilaminant roofing membrane comprising a first ply of white polymeric sheeting material and a second ply of polymeric sheeting material, the first ply of white polymeric sheeting material being laminated to the second ply of polymeric sheeting material and being prepared from a composition of matter comprising: 100 parts by weight of at least one polymeric rubber selected from the group consisting of ethylene-propylene-diene terpolymers, ethylene-propylene copolymers and other polyolefinic type polymers; from about 60 to about 150 parts by weight of a blend of at least two mineral fillers, per 100 parts of the polymeric rubber, wherein one of the mineral fillers is a reinforcing silica and wherein another of the mineral fillers is a chemically modified clay; from about 35 to about 100 parts by weight of a processing oil, per 100 parts of the polymeric rubber; from about 2.5 to about 5 parts by weight of a sulfur cure package having at least one accelerator but being devoid of any thiuram accelerators, the cure package allowing the sheeting material to cure at about the same rate as a comparable black roof sheeting material at 160° C.

The present invention further includes a method for covering a roof comprising: applying a bilaminant of sheeting material comprising a white-colored ply and a black-colored ply to the roof being covered; the white colored ply being prepared from a composition of matter comprising 100 parts by weight of at least one polymeric rubber selected from the group consisting of ethylene-propylene-diene terpolymers, ethylene-propylene copolymers and other polyolefinic type polymers; from about 20 to about 300 parts by weight of a blend of at least two non-black mineral fillers, per 100 parts of the polymeric rubber; from about 20 to about 150 parts by weight of a processing oil, per 100 parts of the polymeric rubber; from 1 to about 6 parts by weight of a sulfur cure package having at least one accelerator but being devoid of any thiuram accelerators, the cure package allowing the sheeting material to cure at about the same rate as a comparable black roof sheeting material at 160° C.

PREFERRED EMBODIMENT FOR CARRYING OUT THE INVENTION

As noted hereinabove, the present invention is directed toward polymeric roof sheeting material which is white or off-white in color and cures at about the same rate at a particular temperature as a conventional carbon-black reinforced roof sheeting material. The white-colored polymeric sheeting material of the present invention includes one or more EPDMs, EPMs or other similar olefin type polymers. Most preferred are the EPDMs.

The term EPDM is used in the sense of its definition as found in ASTM D-1418-94 and is intended to mean a terpolymer of ethylene, propylene and a diene monomer with the residual unsaturation portion of the diene in the side chain. Methods for preparing such EPDM terpolymers are well known in the art. One illustrative method can be found in U.S. Pat. No. 3,280,082, the disclosure of which is incorporated herein by reference. Other illustrative methods can be found, for example, in *Rubber and Chemistry & Technology*, Vol. 45, No. 1, Division of Rubber Chemistry (March 1992); Morton, *Rubber Technology*, 2d ed., Chapter 9, Van Nostrand Reinhold Company, New York (1973); *Polymer Chemistry of Synthetic Elastomers*, Part II, *High Polymer Series*, Vol. 23, Chapter 7, John Wiley & Sons, Inc. New York (1969); *Encyclopedia of Polymer Science and Technology*, Vol. 6, pp.367–68, Interface Publishers, a division of John Wiley & Sons, Inc., New York (1967); *Encyclopedia of Polymer Science and Technology*, Vol. 5, p. 494, Interface Publishers, a division of John Wiley & Sons, Inc., New York (1966); and *Synthetic Rubber Manual*, 8th ed., International Institute of Synthetic Rubber Producers, Inc. (1980).

Preferably, the EPDM based roof sheeting composition has from about 60 to about 72 weight percent ethylene and from about 2 to about 3.5 weight percent of the diene with the balance of the polymer being propylene or some other similar olefin type polymer. Preferably, the EPDM terpolymer should have between about 2 to about 3.2 weight percent unsaturation.

The diene monomer utilized in forming the EPDM terpolymer is preferably a non-conjugated diene. Illustrative examples of non-conjugated dienes which may be employed are dicyclopentadiene; alkyldicyclopentadiene; 1,4-pentadiene; 1,4-hexadiene; 1,5-hexadiene; 1,4-heptadiene; 2-methyl-1,5-hexadiene; cyclooctadiene; 1,4-octadiene; 1,7-octadiene; 5-ethylidene-2-norbornene; 5-n-propylidene-2-norbornene; 5-(2-methyl-2-butenyl)-2-norbornene and the like.

A typical EPDM suitable for use in the present invention is Keltan 6520A, an EPDM terpolymer having a Mooney Viscosity ($ML_4$ at 125° C.) of about 62, an ethylene content of between about 68 and 69 weight percent and about 2.5 weight percent of unsaturation (5-ethylidene-2-norbornene).

As noted hereinabove, more than one EPDM may be employed. Where more than one EPDM is employed, it is preferred that the EPDM rubbers be blended to form the rubber composition. A typical EPDM polymer blend may include such EPDMs as are available under the tradenames Keltan® 6520A together with either Royalene® 3180 or Royalene® 3880, available from Uniroyal Chemical Company. The preferred Royalene EDPM terpolymer includes Royalene 3180 which has a Mooney viscosity ($ML/_4$ at 125° C.) between about 53 and 54, an ethylene content of about 67 weight percent and about 2.2 weight percent unsaturation. The other preferred Royalene EPDM terpolymer which may be used to replace Royalene 3180 is Royalene 3880 which has a Mooney viscosity ($ML/_4$ at 125° C.) of about 61, an ethylene content of about 70 weight percent and about 2.5 weight percent unsaturation. Preferably, the unsaturation is 5-ethylidene-2-norbornene (ENB). In a preferred embodiment, from about 40 to 100 percent of the first EPDM terpolymer is employed as the rubber component, and from 0 to about 60 percent of the second EPDM terpolymer, having different properties from the first, is employed.

The term EPM is used in the sense of its definition as found in ASTM D-1418-94 and is intended to mean a copolymer of ethylene and propylene. The preferred copolymers contain from about 60 to 72 weight percent ethylene with the balance, to total 100 weight percent, being propylene. A typical EPM suitable for use in the present invention is available from DSM Copolymer under the tradename Keltan® 740. This EPM has a Mooney viscosity ($ML/_4$ at 125° C.) of about 63 and an ethylene content of about 60 weight percent. A non-staining polymer stabilizer is used in the manufacture of this particular EPM.

It will be appreciated that other olefin-type polymers and copolymers, such as, e.g., ethylene-butene copolymers, ethylene-octene copolymers, and the like, may also be useful as a roofing material in the present invention and can be used to practice this invention. For purposes of discussion herein, references to polymers is intended to include any of the EPDM, EPM or similar olefinic polymers of the present invention.

The mineral-filled compositions or compounds employed to form the roof sheeting material comprise 100 parts by weight of at least one EPDM, EPM, or other similar olefinic type polymers, including mixtures thereof, to which are added non-black mineral fillers as replacement for traditionally used black fillers, as well as processing materials and, optionally, other components, all of which are discussed hereinbelow.

With respect first to the non-black mineral fillers, several such fillers have been employed in the past, including those selected from the group consisting of hard clays, soft clays, chemically modified clays, mica, talc, alumina trihydrates, calcium carbonate, titanium dioxide, silica, and certain mixtures thereof. In some instances, like the present invention, these fillers completely replace "black" fillers, i.e. carbon black and other petroleum-derived materials.

In the present invention and, more particularly, the preferred embodiment, only two of these non-black mineral fillers are employed, and a combination of these non-black mineral fillers provides the preferred sheeting material of the present invention. Specifically, the non-black mineral fillers of the present invention preferably include a combination of a chemically modified clay or silicate and a reinforcing silica.

Chemically modified reinforcing clays are known in the art. Cross-linking ability is imparted to the clay by modifying the surface of the individual particles with a polyfunctional silane coupling agent. Chemically modified clays are used in the amount of from about 20 parts to about 300 parts per 100 parts of rubber(phr), preferably in an amount from about 60 to 175 phr. The preferred range of chemically modified clays (60 to 175 phr) is about equal to the amount of carbon black normally used in preparing sulfur cured EPDM roof sheeting. Normally the specific gravity of most clays is about 2.60 at 25° C. The preferred chemically modified clays are commercially available from J. M. Huber Corporation and include: Nucap® 190, Nucap® 200, Nucap® 290, Nulok® 321, Nulok® 390 and Polyfil® 368. Another preferred chemically modified clay is Mercap® 100 commercially available from Kentuch-Tennessee Clay Company. Most preferred of these are Mercap® 100 and Nucap® 190.

As an alternative to the chemically modified clay, a silicate may have utility in the present invention. Synthetic amorphous calcium silicates are preferred and are commercially available from the J. M. Huber Company under the trademark Hubersorb 600. Hubersorb 600 is characterized as having an average particle size of 3.2 micrometers (by the Coulter Counter Method), oil absorption of 450 ml/100 g of calcium silicate, a BET (Brunaver-Emmet-Teller nitrogen adsorption procedure) surface area of 300 $m^2/g$ and a pH (5% solution) of 10.

Other silicates which may be used to practice the present invention include precipitated, amorphous sodium aluminosilicates available from the J. M. Huber Company under the tradenames Zeolex 23 and Zeolex 80. Zeolex 23 has a BET surface area of about 75 $m^2/g$, a refractive index at 20° C. of about 1.51, and a pH of about 10.2 determined by slurring 20 grams of silicate with 80 grams of deionized water. In comparison, Zeolex 80 has a BET surface area of about 115 $m^2/g$, a refractive index at 20° C. of about 1.55, and a pH of about 7. The average particle size, density, physical form and oil absorption properties are similar to each other.

Reinforcing silicas are also used as non-black fillers, preferably in conjunction with one or more of the chemically modified clays noted hereinabove. Silica (silicon dioxide) utilizes the element silicon and combines it in a very stable way with two oxygen atoms. Basically, there are two different forms of silica, crystalline and amorphous (noncrystalline). The basic crystalline from of silica is quartz, although there are two other crystalline forms of silica that are less common—tridymite and cristobalite. On the other hand, the silicon and oxygen atoms can be arranged in an irregular form as can be identified by X-ray diffraction. This form of silica is classified as amorphous (noncrystalline), because there is no detectable crystalline silica as determined by X-ray diffraction. Only amorphous silicas are preferred in this invention.

The most preferred silica, i.e., a fine particle, hydrated amorphous silica, is available from PPG Industries, Inc. in a low dust granular form under the tradename HiSil® 190G. Reinforcing silicas are generally characterized in terms of surface area ($m^2/g$ by the BET procedure) or particle size as determined by either electron microscopy or the Coulter Counter Method. HiSil® 190G has an unexpectedly large surface area of 215 $m^2/g$ and an oil (DBP) absorption of about 269 ml/100 g. Generally speaking, a high surface area signifies a smaller particle size, and HiSil® 190G has a particle size of between about 16 and 17 nanometers as determined by the Coulter Counter Method. It is believed that the high surface area and small particle size tends to allow HiSil® 190G to be more reinforcing than other reinforcing silicas, such as, for example HiSil® 243LD. Thus, HiSil® 190G is a more structured type of silica, which allows for the use of higher silica loadings compared to HiSil® 243LD. Also, the engineering process used to precipitate the two silicas utilizes different acids.

These silicas can be employed in the amount of about 10 parts to about 110 parts per 100 parts of rubber (phr), preferably in an amount from about 10 to 30 phr. The useful upper range is limited by the high viscosity imparted by fillers of this type.

In some instances, a number of other types of clays besides chemically modified clays may be useful. Three other basic types of clays which are normally used as reinforcing fillers for rubber elastomers include airfloated, water washed, and calcined clays.

The airfloated clays are the least expensive and most widely used. They are divided into two general groups, hard and soft, and offer a wide range of reinforcement and loading possibilities. Hard Clays may be used in the amount of about 20 parts to about 300 parts per 100 parts of rubber (phr), preferably in an amount from about 65 to 210 phr. The preferred range of hard clays (65 to 210 phr) is about equal to or slightly higher than the amount of carbon black normally used in preparing sulfur cured EPDM roof sheeting. The preferred airfloated hard clays used are: Suprex®, Barden R®, and LGB®, all commercially available from J. M. Huber Corporation.

The airfloated soft clays are used in the amount of about 20 parts to about 300 parts per 100 parts of rubber (phr), preferably in an amount from about 75 to 235 phr. The preferred range of soft clays (75 to 235 phr) is also about equal to the amount of carbon black normally used in preparing sulfur cured EPDM roof sheeting. The preferred airfloated soft clays used are Paragon® and K-78® commercially available from J. M. Huber Corporation and Hi-White R® available from Evans Clay.

Water washed clays are normally considered as semi-reinforcing fillers. This particular class of clays is more closely controlled for particle size by the water-fractionation process. This process permits the production of clays within controlled particle size ranges. The preferred ranges of water washed clays are very similar to the preferred amounts of airfloated soft clays mentioned hereinabove. Some of the preferred water washed clays include Polyfil® DL, Polyfil® F, Polyfil® FB, Polyfil® HG-90, Polyfil® K and Polyfil® XB; all commercially available from J. M. Huber Corporation.

The third type of clay includes the calcined clay. Clays normally contain approximately 14 percent water of hydration, and most of this can be removed by calcination. The amount of bound water removed determines the degree of calcination. The preferred ranges of calcined clays are very similar to the preferred amounts of airfloated hard clays mentioned hereinabove. Some of the preferred calcined clays include Polyfil® 40, Polyfil® 70, and Polyfil® 80, all commercially available from J. M. Huber Corporation.

With respect to the processing material, it is included to improve the processing behavior of the composition (i.e. reduce mixing time, enhance pigment incorporation, and increase the rate of sheet forming). The processing oil is included in an amount ranging from about 20 parts to about 150 parts process oil per 100 parts rubber (phr), preferably in an amount ranging from about 60 to stays in 100 phr. A preferred processing oil is a paraffinic oil, e.g. Sunpar 150 LW, which is available from the Sun Oil Company. Other desirable processing oils which are essentially colorless and may have utility in this invention include Tufflo® 6056, commercially available from Lyondell Petrochemical Company of Houston, Tex., and Paraflex® HT-100, commercially available from Petro Canada, Mississauga, Ontario. Both of these petroleum-derived processing oils are essentially free of aromaticity as well as sulfur (<0.04 weight percent) and have refractive indices ranging between about 1.4755 to 1.4774. Other petroleum derived oils including naphthenic oils may be used.

Notably, the processing oil should be non-staining and not "bloom" to the surface of the cured rubber membrane.

Regarding the cure package, sulfur or sulfur vulcanizing agents or mixtures thereof are preferred and are typically employed in the composition in amounts ranging from about 1.5 phr to about 10 phr by weight, although from about 2 phr to about 5 phr is more preferred. In effect, curing of the EPDM or like rubbers can be effected by any of the well known curing systems, including the sulfur and sulfur-donor cure systems noted hereinabove, as well as peroxide cure systems and quinone-type cure systems.

In the sulfur cure system, when used in compositions of this invention, sulfur is preferably employed in amounts of about 0.25 phr to about 2 phr, with about 1 phr being more preferred. In addition, the cure package may provide one or more accelerators or vulcanizing agents including, but not necessarily limited to, dithiocarbamate accelerators, including the metal dialkyldithiocarbamates such as, for example, zinc dibutyidithiocarbamate (ZDBDC), zinc diethyldithiocarbamate, zinc dimethyldithiocarbamate, and ferric dimethyidithiocarbamate; and thiazole accelerators including 2-mercaptobenzothiazole, the benzothiazole disulfides such as, for example, mercaptobenzothiazole disulfide (MBTS), and the benzothiazole sulfenamides, such as, for example, n-cyclohexyl-2-benzothiazole sulfenamide. Other useful accelerators which may be employed with the EPDM terpolymers include 2,2'-dibenzothiazyl disulfide, tetramethylthiuram disulfide, 4,4'-dithiomorpholine, dipentamethylene thiuram hexasulfide, tetramethylthiuram monosulfide, zinc o,o-dibutylphosphorodithioate, and the like. However, in the preferred embodiment, the composition is devoid of thiuram accelerators. Specific vulcanization systems may further depend upon how the composition is to be used, e.g., as a roofing membrane or as a roof flashing composition. In addition, such systems will depend on the desired vulcanization conditions, e.g., vulcanization times, vulcanization temperatures, and vulcanizer pressure.

It will be appreciated that the foregoing accelerators are not exclusive, and that other vulcanizing agents known in the art to be effective in the curing of EPDM may also be utilized. For a list of additional vulcanizing agents, see The Vanderbilt Rubber Handbook, RT Vanderbilt Co., Norwalk, Conn. 06855 (1979). However, the selection of accelerators should be made carefully, especially when the mineral-filled (non-black) EPDM membrane composition is to be cured at the same rate as the carbon black-reinforced EPDM membrane composition where the compositions will be used to form a white-on-black membrane bilaminant.

Moreover, it has been found that the use of a combination of MBTS and ZDBDC as accelerators offers a number of advantages over other accelerators such as the thiuram accelerators including tetramethylthiuram monosulfide (TMTMS) and tetramethylthiuram disulfide (TMTDS), and certain sulfenamide accelerators such as, for example, t-butyl-2-benzothiazyl sulfenamide (TBBS). This combination has been found to improve tear resistance. Still further, this combination provides a lower raw material cost than these other accelerators listed hereinabove.

Optional ingredients include, for example, other elastomers (e.g., butyl elastomer, neutralized sulfonated EPDM, neutralized sulfonated butyl) in place of minor amounts of the EPDM, secondary inorganic fillers (e.g., talc, mica, clay, silicates, whiting) with total secondary filler content usually ranging from about 10 to about 65 phr, and conventional amounts of other conventional additives, such as zinc oxide, stearic acid, antioxidants, processing aids, antiozonants, flame retardants, and the like.

The compounding ingredients can be admixed, utilizing an internal mixer (such as a Banbury mixer), an extruder, and/or a two-roll mill, or other mixers suitable for forming viscous, relatively uniform admixtures. When utilizing a type B Banbury internal mixer, in a preferred mode, the dry or powdery materials such as the mineral fillers as well as zinc oxide, stearic acid and antioxidant of the present invention are added first, followed by the liquid process oil and finally the polymer, i.e., EPDM (this type of mixing can be referred to as an upside-down mixing technique). The resultant mixture forms a masterbatch to which the cure package can then be added. The cure package typically includes sulfur and one or more organic accelerators.

The resulting admixture may then be sheeted to a thickness ranging from about 5 to about 200 mils, and preferably from about 40 to about 60 mils, by conventional sheeting methods, for example, milling, calendering or extrusion. Preferably, the admixture is sheeted to at least 40 mils and is bonded to a black sheeting material having essentially the same characteristics as the mineral filler (non-black) sheeting material of the present invention using conventional processing techniques. Typically, the plies are calendered separately and then laminated together in an uncured state, to be dusted and cured in an autoclave or be other means. Thus, it will be appreciated why it is preferred to have a white membrane cure at about the same rate as the black membrane at a specified temperature, preferably 160° C.

The black ply may be slightly thicker than the white rubber ply, but the total thickness of the resultant membrane bilaminant should be at least 40 mils (0.040-inches) which is the minimum thickness specified in standards set by the Roofing Council of the Rubber Manufacturers Association for non-reinforced EPDM rubber sheets for use in roofing applications. In many cases, the bilaminant may have a thickness of 40–45 mils since this is the thickness for a large percentage of "single-ply" roofing membranes used commercially. The sheeting can be cut to the desired length and width dimensions at this time. In this embodiment, the top ply is typically the mineral filled (non-black) composition while the bottom ply is a carbon black reinforced composition, the two plies being laminated together at the calender to form a white-on-black membrane bilaminant.

The method of the present invention is practiced by utilizing the mineral filled, i.e., white, polymeric sheet material as described herein. The mineral filled sheet material is used in conjunction with a black sheet material to form a membrane bilaminant suitable for use in covering the roof of a building. The bilaminant typically comes to the construction site in the form of a roll. To cover the roof, the bilaminant is unrolled on the roof and sealed and seamed together as is known in the art.

In order to demonstrate practice of the present invention, several white EPDM compositions were prepared and subjected to a variety of tests to obtain data as to the physical properties of the resultant membranes prepared. The preferred EPDM polymer selected for these compositions was Keltan 6520A, this terpolymer having about 68 weight percent ethylene and 2.5 percent by weight unsaturation. A more detailed characterization of this EPDM terpolymer was provided hereinabove.

Each of the EPDM compositions prepared according to the present invention also included about 100 phr of the chemically modified clay, NuCap 190. As noted hereinabove, this clay is a chemically modified clay wherein the surface of the individual particles thereof are modified with a polyfunctional mercaptosilane coupling agent to impart cross-linking ability of the clay particle to the rubber matrix.

This chemically modified clay filler was blended with a reinforcing silica, namely Hi-Sil 190G. This filler system is believed to be unique to the extent that this is the first known instance where a filler system for a roofing membrane included a blend of a reinforcing silica (Hi-Sil 190G) and a chemically modified clay (NuCap 190).

Other ingredients, including titanium dioxide to provide brightness to the membrane, have also been included. The first six compounds (Compound Nos. 1–6) in Table I provide examples of the mineral filled (non-black) EPDM roofing membranes of the present invention and are submitted for the purpose of further illustrating the nature of the present invention. In Table I, unless otherwise noted, all parts are listed as parts by weight per 100 parts of rubber hydrocarbon (phr).

TABLE I

| | Mineral Filled (Non-Black) EPDM Compositions | | | | | | | | | |
|---|---|---|---|---|---|---|---|---|---|---|
| Compound No. | 1 | 2 | 3 | 4 | 5 | 6 | 7 | 8 | 9 | 10 |
| EPDM[a] | 100 | 100 | 100 | 100 | 100 | 100 | 100 | 100 | 100 | 100 |
| Chemically Modified Clay[b] | 100 | 100 | 100 | 100 | 100 | 100 | 120 | 135 | — | — |
| Titanium Dioxide | 15 | 10 | 10 | 10 | 12 | 12 | 15 | 15 | 15 | 15 |
| Reinforcing Silica Powder[c] | 10 | 20 | 25 | 25 | 30 | 30 | — | — | 75 | 105 |
| Zinc Oxide | 5 | 5 | 5 | 5 | 5 | 5 | 5 | 5 | 5 | 5 |
| Stearic Acid | 1.50 | 1.50 | 1.50 | 1.50 | 1.50 | 1.50 | 1.50 | 1.50 | 1.50 | 1.50 |
| Polyethylene glycol[d] | 2 | 2 | 2 | 2 | 2 | 2 | 2 | 2 | 2 | 2 |
| Antioxidant[e] | 2.50 | 2.50 | 2.50 | 2.50 | 2.50 | 2.50 | 2.50 | 2.50 | 2.50 | 2.50 |
| Paraffinic oil[f] | 50 | 50 | 50 | 50 | 55 | 57.5 | 50 | 50 | 50 | 50 |
| Ultramarine Blue | 0.20 | 0.20 | 0.20 | 0.20 | 0.25 | 0.25 | 0.20 | 0.20 | 0.20 | 0.20 |
| Masterbatch | 286.2 | 291.2 | 296.2 | 296.2 | 308.25 | 310.75 | 296.2 | 311.2 | 251.2 | 281.2 |
| Sulfur | 1.05 | 1.05 | 1.05 | 1.05 | 1.0 | 1.0 | 1.05 | 1.05 | 1.05 | 1.05 |

TABLE I-continued

| Mineral Filled (Non-Black) EPDM Compositions | | | | | | | | | | |
|---|---|---|---|---|---|---|---|---|---|---|
| Compound No. | 1 | 2 | 3 | 4 | 5 | 6 | 7 | 8 | 9 | 10 |
| ZDBDC[g] | 0.50 | 0.60 | 0.70 | 0.80 | 0.75 | 0.70 | 0.50 | 0.50 | 0.50 | 0.50 |
| MBTS[h] | 2.75 | 2.80 | 2.80 | 2.80 | 2.50 | 2.65 | 2.75 | 2.75 | 2.75 | 2.75 |
| Total | 290.50 | 295.65 | 300.75 | 300.85 | 312.50 | 315.10 | 300.50 | 315.50 | 255.50 | 285.50 |
| Specific gravity (cured) | 1.2629 | — | — | — | 1.2776 | 1.2730 | — | — | — | — |

[a]Keltan 6520A
[b]NuCap ® 190 clay: Mercapto-Functional Hydrated Aluminum Silicate having a specific gravity of about 2.60 commercially available from J. M. Huber Company.
[c]HiSil ® 190G: A white reinforcing silica powder having a BET surface area of about 210 sq. meters/gram, a specific gravity of about 1.95 and commercially available from PPG Industries, Inc.
[d]Carbowax ® 3350: Polyethylene glycol (flake-form) having a specific gravity of about 1.20.
[e]Antioxidant 872: Non-staining, non-discoloring modified polymeric phenol antioxidant commercially available from Sovereign Chemical Company.
[f]Sunpar ® LW 150: Odorless, low sulfur paraffinic process oil with a very small amount of aromaticity and an aniline point of about 116° C.
[g]ZDBDC: Zinc dibutyldithiocarbamate.
[h]MBTS: Benzothiazyl disulfide.

In the examples illustrated in Table I, Compounds 1–6 were prepared with 100 parts by weight Keltan 6520A and 100 parts by weight NuCap 190 Clay. The compounds essentially differed by the amount of HiSil 190G silica and the amount of titanium dioxide employed, although Compounds 5 and 6 further differed by the amount of processing oil, namely Sunpar 150 LW employed. Each of the compounds were prepared utilizing standard rubber mixing techniques and equipment by mixing together the ingredients listed hereinabove.

For Compounds 7 and 8, the reinforcing silica was left out of the composition. For Compounds 9 and 10, the chemically modified clay was left out of the composition. In order to compensate for the loss of the silica or clay ingredient, a compensating amount of the other ingredient was additionally added to the Compound.

In order to evaluate the properties of the sheeting materials of the present invention, the Compounds were prepared by compounding the elastomers, fillers, process oil, and other additives in a type B Banbury internal mixer, and calendered as described hereinabove.

The results of the various properties tested, including processing safety, compound viscosity, die "C" tear resistance, trouser tear properties, stress-strain properties, and cured compound durometer, are reported herein in Table II.

TABLE II

| Mineral Filled (Non-Black) EPDM Compositions - Unaged and Heat Aged Physicals | | | | | | | | | | |
|---|---|---|---|---|---|---|---|---|---|---|
| Compound No. | 1 | 2 | 3 | 4 | 5 | 6 | 7 | 8 | 9 | 10 |
| Rheometer at 160° C. - Mini-die, 3° Arc | | | | | | | | | | |
| Scorch Time, minutes | 8.15 | 7.50 | 7.44 | 7.00 | 8.34 | 9.32 | 7.17 | 7.54 | 9.52 | 9.18 |
| Time to 90% cure, minutes | 23.5 | 22.5 | 22.5 | 22.5 | 22.5 | 24.4 | 21.09 | 23.45 | 25.39 | 24.11 |
| Maximum Torque, lb.-inch | 44.6 | 49.3 | 52.0 | 55.2 | 45.0 | 39.3 | 38.9 | 42.3 | 43.4 | 55.4 |
| Mooney Scorch at 135° C. - large rotor | | | | | | | | | | |
| Minimum Viscosity, Mu | 30.1 | 37.1 | 43.0 | 45.7 | 40.7 | 42.3 | 27.8 | 30.6 | 94.5 | >100 |
| $T_5$, minutes | 32.2 | 29.9 | 30.1 | 28.7 | 38.2 | 43.3 | 26.8 | 30.8 | 39.2 | — |
| $T_{35}$, minutes | 57.7 | 46.3 | 44.3 | 42.3 | 57.2 | >60 | 53.8 | >60 | >60 | — |
| Stress-Strain Properties at 23° C. - Slabs cured 45 minutes at 160° C. (unaged) Unaged | | | | | | | | | | |
| 100% Modulus, psi | 255 | 260 | 300 | 320 | 275 | 270 | 290 | 315 | 200 | 260 |
| 300% Modulus, psi | 450 | 510 | 550 | 585 | 525 | 500 | 440 | 470 | 380 | 475 |
| Tensile at break, psi | 1605 | 1800 | 1950 | 2060 | 1810 | 1615 | 1460 | 1525 | 1150 | 1365 |
| Elongation at break, % | 690 | 665 | 640 | 625 | 620 | 610 | 635 | 615 | 640 | 695 |
| Stress-Strain Properties at 23° C. Heat Aged 28 Days at 116° C. | | | | | | | | | | |
| 100% Modulus, psi | 450 | 550 | 650 | 685 | 515 | 525 | 525 | 610 | 482 | 780 |
| 300% Modulus, psi | 825 | 1125 | 1310 | 1400 | 975 | 1000 | 875 | 950 | 1575 | 1390 |
| Tensile at break, psi | 1385 | 2080 | 1900 | 1610 | 1935 | 1950 | 980 | 1050 | 2880 | 2265 |
| Elongation at break, % | 470 | 500 | 435 | 365 | 505 | 515 | 350 | 360 | 640 | 695 |
| Die C Tear Properties at 23° C. - Slabs cured 45 minutes at 160° C. Unaged | | | | | | | | | | |
| Lbs./Inch | 152 | 203 | 214 | 199 | 201 | 207 | 167 | 171 | 256 | 275 |
| Heat Aged 28 Days at 116° C. | | | | | | | | | | |
| Lbs./Inch | 111 | 138 | 145 | 166 | 183 | 169 | 135 | 147 | 246 | 217 |

TABLE II-continued

Mineral Filled (Non-Black) EPDM Compositions - Unaged and Heat Aged Physicals

| Compound No. | 1 | 2 | 3 | 4 | 5 | 6 | 7 | 8 | 9 | 10 |
|---|---|---|---|---|---|---|---|---|---|---|
| Shore "A" Hardness | | | | | | | | | | |
| Unaged - Tested at 23° C. | 59 | 62 | 62 | 63 | 62 | 62 | 65 | 65 | 68 | 82 |
| Aged 28 Days at 116° C. | 68 | 73 | 75 | 75 | 72 | 72 | 72 | 75 | 80 | 91 |
| Trouser Tear at 23° C. - Machine Direction Unaged | | | | | | | | | | |
| Lbs./Inch | — | — | — | — | — | — | 92 | 103 | 213 | 241 |
| Type of tear pattern | — | — | — | — | — | — | Diagonal | Diagonal | Straight | Straight |
| Heat Aged 28 Days at 116° C. | | | | | | | | | | |
| Lbs./Inch | — | — | — | — | — | — | 31 | 38 | 100 | 57 |
| Type of tear pattern | — | — | — | — | — | — | Diagonal | Diagonal | Straight | Straight |
| Trouser Tear at 23° C. - Cross Direction Unaged | | | | | | | | | | |
| Lbs./Inch | — | — | — | — | — | — | 91 | 112 | 206 | 245 |
| Type of tear pattern | — | — | — | — | — | — | Diagonal | Diagonal | Straight | Straight |
| Heat Aged 28 Days at 116° C. | | | | | | | | | | |
| Lbs./Inch | — | — | — | — | — | — | 28 | 37 | 121 | 54 |
| Type of tear pattern | — | — | — | — | — | — | Straight | Diagonal | Hook | Diagonal |

The cure characteristics of the mineral filled (non-black) EPDM rubber compositions were determined by means of a Monsanto Oscillating Disc Rheometer (described in detail in American Society for Testing and Materials Standard ASTM D 2084). The metal die used to measure the scorch time, cure rates and state of cure is referred to as a mini-die. During testing, the die oscillated at a 3° arc. According to the rheometer data, Compound Nos. 2–4 and 7–8 were some of the faster curing compounds while Compound No. 9 has the slowest curing rate of the ten compounds shown in Table II.

The test method (ASTM D 1646) covers the use of the shearing disk viscometer for measuring the Mooney Viscosity of raw polymers and fully compounded rubber composition. The viscosity of the fully compounded rubber vulcanization can be detected with this instrument as evidenced by an increase in viscosity. Therefore, this test method can be used to determine incipient cure time and the rate of cure during very early stages of vulcanization. Based on Mooney Scorch data at 135° C., Compound Nos. 2, 4 and 7 were some of the faster curing mineral filled (non-black) rubber compositions. Compound Nos. 5, 6, and 9 were some of the slower curing compounds according to the Mooney Scorch date provided in Table II.

For testing purposes, dumbbell-shaped specimens were cut using the appropriate metal die from individual cured 45 mil six by six-inch flat rubber slabs (compression molded 45 minutes at 160° C.) in accordance with ASTM D 412 (Method A—dumbbell and straight). Modulus, tensile strength and elongation at break measurements were obtained on both unaged and heat aged (28 days at 116° C.) dumbbell-shaped test specimens using a table model Instron® Tester, Model 4301, and the test results were calculated in accordance with ASTM D 412. Heat aged test specimens were taken from cured slabs which were aged in a forced air oven for 28 days at 116° C. in accordance with ASTM D 573. Heat aging is an accelerated aging test designed to determine the effect of heat on the thermal stability of the chemical crosslinks formed during the actual vulcanization process. All dumbbell-shaped specimens either unaged or heat aged were allowed to set for about 24 hours, before testing was carried out at 23° C. The highest tensile strength results were obtained with Compound Nos. 2–5, while all ten compounds listed in Table II produced similar ultimate elongation properties. The Instron® Tester (a testing machine of the constant rate-of-jaw separation type) is equipped with suitable grips capable of clamping the test specimens without slippage.

Tear properties were determined by using a metal die (90° angle die C) to remove the test specimens from cured 45 mil six by six-inch flat rubber slabs (compression molded 45 minutes at 160° C.) in accordance with ASTM D 624. All die C tear specimens, both unaged and heat aged (28 days at 116° C.) were allowed to set for about 24 hours, before testing was carried out at 23° C.

The heat aged specimens were taken from cured slabs which were aged in a forced air oven for 28 days at 116° C. in accordance with ASTM D 573. Oven aging is an accelerated heat aging test designed to determine the effect of heat on the thermal stability of the chemical crosslinks formed during the actual vulcanization process. Tear properties, in lbs./inch, were obtained using a table model Instron® Tester, Model 4301 and the test results were calculated in accordance with ASTM Method D624. Compound No. 9 showed a substantial increase in die C tear properties after heat aging 28 days at 116° C. Increasing the level of HiSil 190G to 75 parts and eliminating NuCap 190 clay dramatically improved die C tear properties.

Trouser tear properties were measured using test specimens (one by three-inches in length) prepared in accordance with the International Standard Organization (ISO) 34 (first edition—Oct. 1, 1979). The heat aged trouser tear specimens were taken from cured slabs which were aged in a forced air oven for 28 days at 116° in accordance with ASTM D573. Tear properties, in lbs./inch, were determined at 23° C. using a table model Instron® Tester, Model 4301 and the test results were calculated in accordance with ISO 34. Compound No. 9 showed a substantial increase in trouser tear properties. Increasing the amount of HiSil 190G to 75 parts and eliminating NuCap 190 clay dramatically improved trouser tear properties.

Shore "A" hardness, which measures the hardness of the cured roofing membrane compound, was conducted at 23°

C. in accordance with ASTM Method D 2240. The cured test specimens were allowed to set for about 24 hours prior to testing. Higher cured compound durometer values were obtained by increasing the level of HiSil 190G in the formulation.

The mineral filled (non-black) rubber compositions listed in Table I (Compound Nos. 1–10) exhibited similar cure characteristics (i.e., scorch time, to 50% and 90% cure, etc.) except Compound Nos. 6, 9 and 10. As can be seen from the data presented in Table II, Compound No. 6 contained the highest process oil loading (57.5 parts) of the ten compounds. Increasing the level of silica reduced the rate of cure somewhat, as exemplified in Compound Nos. 9 and 10 that contained high silica loadings and slightly lower levels of ZDBDC. As can be seen in Table II, increasing the level of HiSil 190G significantly increased the viscosity of Compound Nos. 9 and 10.

In Compound Nos. 3 and 4, stress-strain properties were improved by holding mineral filler and process oil loadings constant and directionally increasing the level of secondary accelerator, ZDBDC. As can be seen in Table II, increasing the amount of silica will slow down the rate of cure, thus prompting the need for directionally increasing the level of ZDBDC accelerator in the mineral filled (non-black) rubber formulae. However, the effect of higher silica loadings on tensile strength is not as noticeable after heat aging the rubber specimens for 28 days at 116° C. For example, Compound Nos. 9–10 showed some exceptionally high tensile strength values (2265 to 2880 psi) after heat aging 28 days at 116° C. On the other hand, Compound Nos. 2 and 3 offer a nice balance between unaged and heat aged stress-strain properties. In other words, the change in modulus, tensile strength and elongation at break were minimal after heat aging 28 days at 116° C.

Silica (HiSil 190G) appeared to influence die C tear and trouser tear properties more than the chemically treated clay, NuCap 190. Compound Nos. 7–8 indicate that NuCap 190 clay without any silica has a negative effect on tear properties. From a viscosity standpoint, levels above about 40–50 parts of silica (HiSil 190G) could have a negative influence on the calenderability of a mineral filled (non-black) rubber composition.

Based on the foregoing results in Table II, the best overall balance of unaged tensile properties were obtained using blends of chemically modified clay and silica (HiSil 190G) as shown in Compound Nos. 2–5 which are listed in between 1800 and 2060 psi. These values easily surpassed the minimum unaged tensile strength requirement of 1305 psi published in ASTM D4637-96 entitled Standard Specification for "EPDM Sheet Used in Single-Ply Roof Membrane," Compound Nos. 1–3 5 and 6 which featured blends of chemically modified clay and silica retained most of their elongations at break (435–515%) after heat aging 28 days at 116° C. Again, the minimum elongation at break requirement specified in ASTM D4637-96 is 200% after heat aging 28 days at 116° C. Also, as can be determined from Table II, the processing characteristics (e.g., cure rates and minimum compound viscosity) of Compound Nos. 2–6 are certainly more desirable than Compound Nos. 7–10, which contained either chemically modified clay or silica alone. Compound viscosities ranging from about 37 to 45 are easier to convert into sheeting compared to compounds which have a very low or high viscosity.

Thus it should be evident that the sheeting material and method of the present invention are highly effective in covering the roof of a building. The invention is particularly suited for use on the roofs of building, but is not necessarily limited thereto. The sheeting material of the present invention can be used separately with other equipment, methods and the like, such as, for example, for linings for fish ponds, decorative and aquatic gardens, ponds on golf courses, and the like.

Based upon the foregoing disclosure, it should now be apparent that the use of the compositions described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, it will be understood that the rubber compositions exemplified herein according to the present invention are not necessarily limited to those having using EPDM terpolymers. Moreover, as noted hereinabove, other fillers and processing oils might be substituted for the specific fillers and oils exemplified hereinabove, and other ingredients may be optionally employed. Thus, the scope of the invention shall include all modifications and variations that may fall within the scope of the attached claims.

What is claimed is:

1. A non-black roof sheeting material prepared from a composition of matter consisting essentially of:

100 parts by weight of at least one polymeric rubber selected from the group consisting of ethylene-propylene-diene terpolymers, ethylene-propylene copolymers and other polyolefinic type polymers;

from about 20 to about 300 parts by weight of a blend of at least two mineral fillers, per 100 parts of said polymeric rubber, wherein one of said mineral fillers is a reinforcing silica and wherein another of said mineral fillers is a clay surface modified with a polyfulctional silane couling agent;

from about 20 to about 150 parts by weight of a processing oil per 100 parts of said polymeric rubber;

from about 1 to about 6 parts by weight of a sulfur cure package having at least one accelerator but being devoid of any thiuram accelerators, said cure package allowing said sheeting material to cure at about the same rate as a carbon black reinforced roof sheeting material at 160° C.

2. A non-black sheeting material, as set forth in claim 1, wherein said polymeric rubber includes at least one ethylene-propylene-diene terpolymer.

3. A non-black sheeting material, as set forth in claim 2, wherein said at least one ethylene-propylene-diene terpolymer has from about 2 to about 3.2 weight percent unsaturation.

4. A non-black sheeting material, as set forth in claim 1, wherein said chemically modified clay is a mercapto-functional hydrated aluminum silicate.

5. A non-black sheeting material, as set forth in claim 1, wherein said reinforcing silica is a powder having a BET surface area of at least about 210 $m^2$/gram.

6. A non-black sheeting material, as set forth in claim 1, wherein said processing oil is selected from the group consisting of paraffinic oils, naphthenic oils and mixtures thereof.

7. A non-black sheeting material, as set forth in claim 1, wherein said processing oil is selected from the group consisting of petroleum-derived processing oils which are essentially free of aromaticity and sulfur.

8. A non-black sheeting material, as set forth in claim 1, wherein said accelerators of said sulfur cure package includes a dithiocarbamate accelerator and a thiazole accelerator.

9. A bilaminant roofing membrane comprising a first ply of white polymeric sheeting material and a second ply of polymeric sheeting material, said first ply of white polymeric sheeting material being laminated to said second ply of polymeric sheeting material and being prepared from a composition of matter consisting essentially of 100 parts by weight of at least one polymeric rubber selected from the group consisting of ethylene-propylene-diene terpolymers, ethylene-propylene copolymers and other polyolefinic type polymers;

from about 60 to about 150 parts by weight of a blend of at least two mineral fillers, per 100 parts of said polymeric rubber, wherein one of said mineral fillers is a reinforcing silica and wherein another of said mineral fillers is a clay surface modified with a polvfimctional silane coupling agent;

from about 35 to about 100 parts by weight of a processing oil per 100 parts of said polymeric rubber;

from about 2.5 to about 5 parts by weight of a sulfur cure package having at least one accelerator but being devoid of any thiuram accelerators, said cure package allowing said first ply of sheeting material to cure at about the same rate as said second ply of sheeting material at 160° C.

10. A bilaminant roofing membrane, as set forth in claim 9, wherein said polymeric rubber includes at least one ethylene-propylene-diene terpolymer.

11. A bilaminant roofing membrane, as set forth in claim 10, wherein said at least one ethylene-propylene-diene terpolymer has from about 2 to about 3.2 weight percent unsaturation.

12. A bilaminant roofing membrane, as set forth in claim 9, wherein said chemically modified clay is a mercapto-functional hydrated aluminum silicate.

13. A bilaminant roofing membrane, as set forth in claim 9, wherein said reinforcing silica is a powder having a BET surface area of at least about 210 $m^2$/gram.

14. A bilaminant roofing membrane, as set forth in claim 9, wherein said processing oil is selected from the group consisting of paraffinic oils, naphthenic oils and mixtures thereof.

15. A bilaminant roofing membrane, as set forth in claim 9, wherein said processing oil is selected from the group consisting of petroleum-derived processing oils which are essentially free of aromaticity and sulfur.

16. A bilaminant roofing membrane, as set forth in claim 9, wherein said accelerators of said sulfur cure package includes a dithiocarbamate accelerator and a thiazole accelerator.

17. A bilaminant roofing membrane, as set forth in claim 9, wherein said second ply of polymeric sheeting material is a second white polymeric sheeting material.

18. A bilaminant roofing membrane, as set forth in claim 9, wherein said second ply of polymeric sheeting material is a black-colored polymeric sheeting material.

19. A method for covering a roof comprising:

applying a bilaminant of sheeting material comprising a white-colored top ply and a black-colored bottom ply to the roof being covered; said white colored ply being prepared from a composition of matter comprising 100 parts by weight of at least one polymeric rubber selected from the group consisting of ethylene-propylene-diene terpolymers, ethylene-propylene copolymers and other polyolefinic type polymers;

from about 20 to about 300 parts by weight of a blend of at least two non-black mineral fillers, per 100 parts of said polymeric rubber, wherein one of said mineral fillers is a reinforcing silica and wherein another of said mineral fillers is a chemically modified clay;

from about 20 to about 150 parts by weight of a processing oil, per 100 parts of said polymeric rubber;

from 1 to about 6 parts by weight of a sulfur cure package having at least one accelerator but being devoid of any thiuram accelerators, said cure package allowing said sheeting material to cure at about the same rate as a comparable black roof sheeting material at 160° C.

* * * * *